(12) United States Patent
Bush et al.

(10) Patent No.: US 6,963,971 B1
(45) Date of Patent: Nov. 8, 2005

(54) METHOD FOR AUTHENTICATING ELECTRONIC DOCUMENTS

(76) Inventors: George Bush, 1675 York Ave., Suite 34B, New York, NY (US) 10128; Estelle Forman Ross, 41 Buxton St., Lido Beach, NY (US) 11561; Peter Preus, 17 Montgomery Pl., Brooklyn, NY (US) 11215

( * ) Notice: Subject to any disclaimer, the term of this patent is extended or adjusted under 35 U.S.C. 154(b) by 0 days.

(21) Appl. No.: 09/465,246

(22) Filed: Dec. 18, 1999

(51) Int. Cl.[7] ............................................. H04L 9/00
(52) U.S. Cl. ...................... 713/153; 713/161; 713/170; 713/181
(58) Field of Search ................................ 713/153, 161, 713/170, 181

(56) References Cited

U.S. PATENT DOCUMENTS

| | | | |
|---|---|---|---|
| 5,509,074 A | | 4/1996 | Choudhury et al. |
| 5,515,439 A | | 5/1996 | Bantz et al. |
| 5,587,809 A | | 12/1996 | Le Corre et al. |
| 5,608,800 A | | 3/1997 | Hoffmann et al. |
| 5,615,268 A | | 3/1997 | Bisbee et al. |
| 5,646,998 A | | 7/1997 | Stambler |
| 5,748,738 A | * | 5/1998 | Bisbee et al. ............... 713/176 |
| 5,872,848 A | * | 2/1999 | Romney et al. ............. 713/176 |
| 5,915,024 A | * | 6/1999 | Kitaori et al. .............. 713/176 |
| 6,157,721 A | * | 12/2000 | Shear et al. ................ 380/255 |
| 6,671,805 B1 | * | 12/2003 | Brown et al. ............... 713/176 |

OTHER PUBLICATIONS

UPS OnLine Dossier, retrieved Apr. 5, 1999.

* cited by examiner

*Primary Examiner*—Gilberto Barrón
*Assistant Examiner*—Grigory Gurshman
(74) *Attorney, Agent, or Firm*—Pitney Hardin LLP

(57) ABSTRACT

A secure method for sending registered, authenticated electronic documents. The invention validates sender and recipient identities, provides for non-repudiation of authenticated documents by sender and recipient, provides an evidence trail, and protects the integrity of the document. The invention is constructed so that a sender can be supplied with proof that the intended recipient received and opened an authenticated document. A neutral third party acts as a document registration agent, and witness to the transmission and receipt of the authenticated document. In the event of a dispute between sender and recipient, the third party can provide an irrefutable record of the contents of the document and of the history of the transmission and receipt of the document Because the third party never has possession of the electronic document, the method provides maximum privacy for sender and recipient. The method is readily adaptable to both key recovery and key escrow.

32 Claims, 9 Drawing Sheets

Fig. 2
String 1
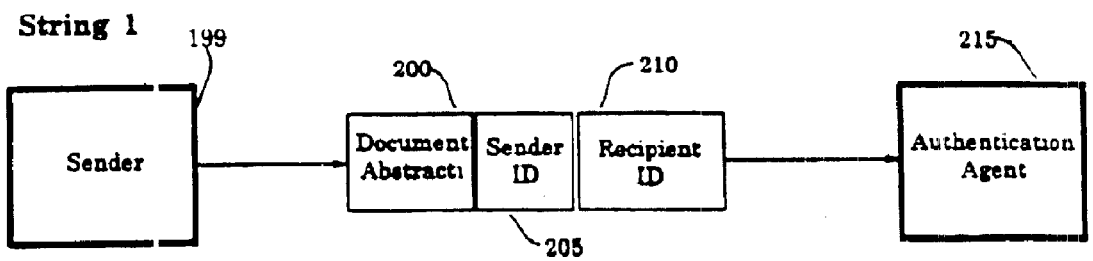
String 2
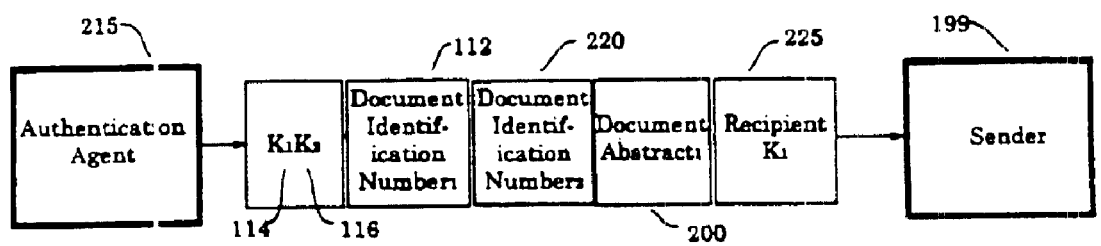
String 3
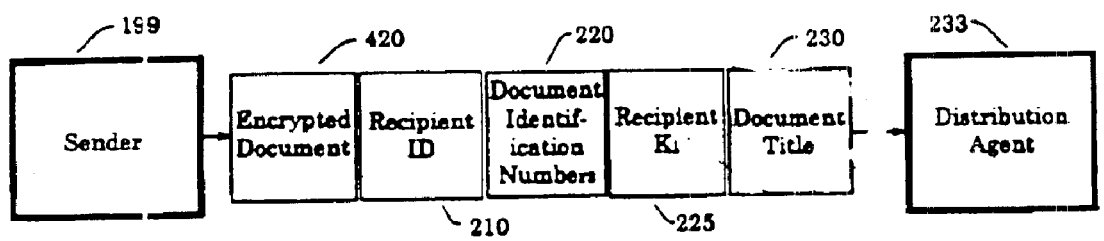
String 4
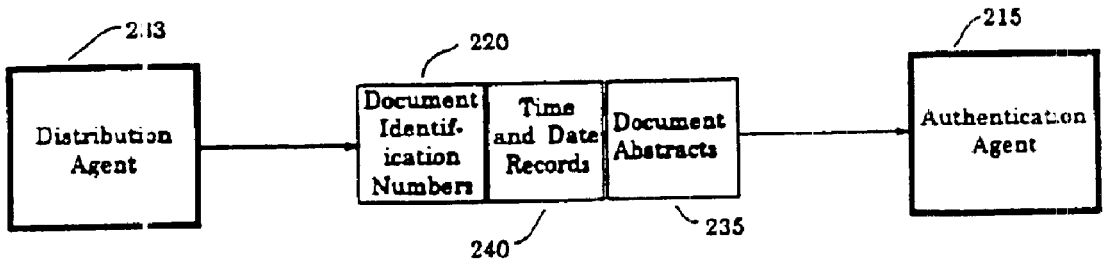

Fig. 3

File A

| Document Identification Numbers | Document Abstracts | Recipient ID | Sender ID |
|---|---|---|---|
| K₁  K₂ | Sender and Recipient Public Keys | Time and Date Records | |

File B

| Document Identification Numbers | Document Abstracts | Recipient ID | Sender ID |
|---|---|---|---|
| K₁  K₂ | Sender and Recipient Public Keys | Time and Date Records | Document Abstracts |
| Time and Date Records | | | |

Fig. 4
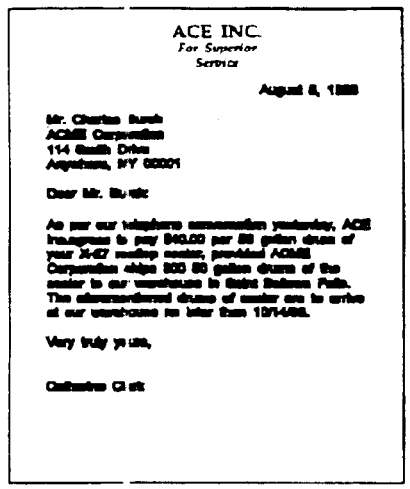
Document 1
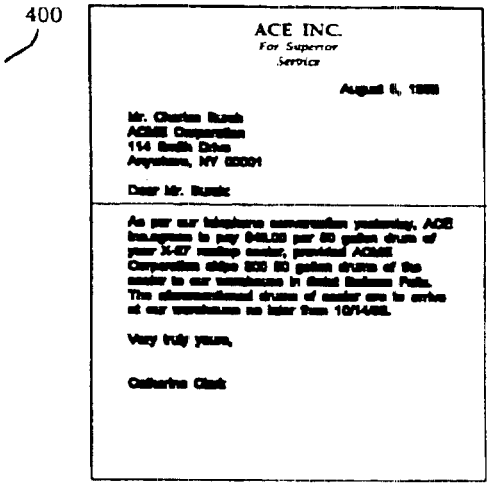
Document 2
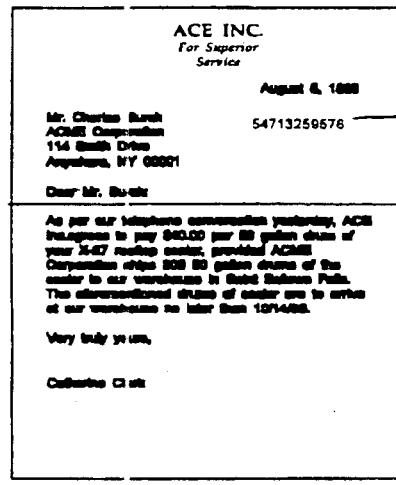
Document 3
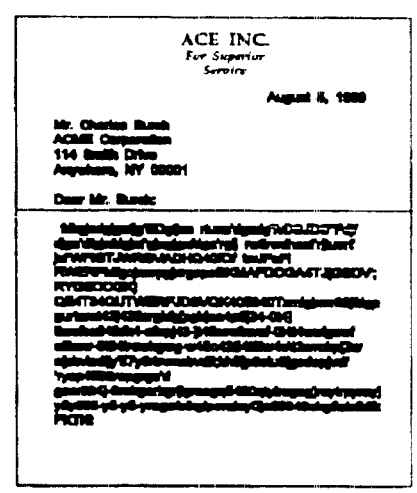
Document 4
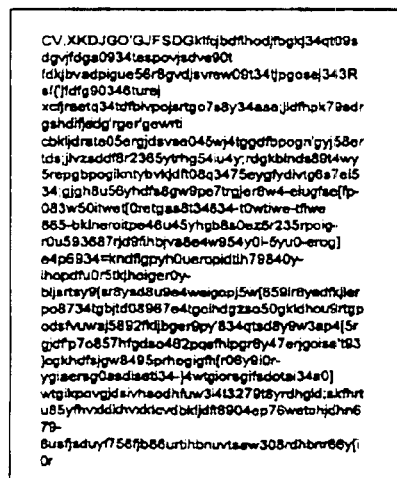
Document 5

Fig. 7

File C

| Document Identification Number₁ | Document Abstract₁ | Recipient ID | Sender ID |
|---|---|---|---|
| K₁ K₃ | Sender and Recipient Public Keys | Time and Date Record₁ | Document Abstract₂ |
| Time and Date Record₂ | Time and Date Record₃ | 600 | |

File D

| Document Identification Number₁ | Document Abstract₁ | Recipient ID | Sender ID |
|---|---|---|---|
| K₁ K₃ | Sender and Recipient Public Keys | Time and Date Record₁ | Document Abstract₂ |
| Time and Date Record₂ | Time and Date Record₃ | Time and Date Record₄ | 700 |

Fig. 8

File E

|                                        |                                        |                         |                     |
| -------------------------------------- | -------------------------------------- | ----------------------- | ------------------- |
| Document Identification Number₁        | Document Abstract₁                     | Recipient ID            | Sender ID           |
| K₁ K₂                                  | Sender and Recipient Public Keys       | Time and Date Record₁   | Document Abstract₂  |
| Time and Date Record₂                  | Time and Date Record₃                  | Time and Date Record₄   | Time and Date Record₅ |
| Document Abstract₃                     |                                        |                         |                     |

700, 705, 557

File F

|                                        |                                        |                         |                     |
| -------------------------------------- | -------------------------------------- | ----------------------- | ------------------- |
| Document Identification Number₁        | Document Abstract₁                     | Recipient ID            | Sender ID           |
| K₁ K₂                                  | Sender and Recipient Public Keys       | Time and Date Record₁   | Document Abstract₂  |
| Time and Date Record₂                  | Time and Date Record₃                  | Time and Date Record₄   | Time and Date Record₅ |
| Document Abstract₃                     | Time and Date Record₆                  |                         |                     |

710

METHOD FOR AUTHENTICATING ELECTRONIC DOCUMENTS

BACKGROUND OF THE INVENTION

1. Field of the Invention

The invention relates to methods for authenticating electronic documents, and in particular to a method that registers proof of the exact content of electronic documents and provides for the establishment of an evidence trail.

2. Description of the Prior Art

Electronic documents such as E-mail have changed the face of commerce. The wide-spread use of electronic documents has increased the pace of commerce and is itself a product of the need to respond quickly to the demands of the marketplace. Electronic communication has replaced paper documents in many transactions. However, the move away from paper documentation to the fast-moving world of electronic documents has come at a price.

As presently configured, electronic documents lack the accountability provided by paper documents. For example, a paper contract bearing signatures provides a vastly greater level of accountability than an E-mail document. Signatures can be verified, providing for a level of non-repudiation which is not available with electronic documents. If one's signature is on a contract, it is difficult to say one was not involved in an agreement.

With E-mail, there are no signatures. Additionally, neither party has proof that the other individual received the E-mail in question, nor does either party have proof of the contents of the E-mail message. For these reasons, electronic documents cannot be trusted for evidentiary purposes.

There have been attempts to provide accountability for electronic documents. U.S. Pat. No. 5,608,800, Hoffmann et al., concerns a process intended to establish whether data transmitted to a recipient has been altered or illicitly introduced. This invention only provides a small part of the goal of making electronic documents as secure and accountable as paper documents. The method provides no means for providing the sender with proof that the intended recipient received the document, nor does the method provide for an evidence trail in the event of a dispute between sender and recipient over message content and timing.

U.S. Pat. No. 5,587,809, Le Corre et al., is a method that provides non-repudiation for fax senders and recipients. While this invention does provide a measure of non-repudiation, it is limited to faxes, requires special equipment, i.e., a secure fax machine, and provides proof only that a neutral third party sent a fax upon the request of the recipient. The recipient can still deny receipt of the fax or dispute the contents of the fax.

U.S. Pat. No. 5,615,268, Bisbee, goes further in the process of providing authentication and accountability for electronic documents. However, it requires users to have special equipment, PCM/CIA cards, and does little to protect the privacy of sender and recipient.

None of the above methods takes into account the interests of all parties concerned with authenticated electronic document transmission. With the present invention, there are four possible participants in an authenticated electronic document transmission, namely the sender, the recipient, a neutral third party, and the government. Each party must have its requirements taken into account for an authentication method to be accepted for wide-spread use.

OBJECTS AND SUMMARY OF THE INVENTION.

An examination of each party's requirements shows that the participants have both similar and differing needs. A sender wants to know that only the intended recipient can have access to an authenticated message, and that eavesdroppers will be denied access. The sender wants proof that the recipient received and opened the message, and that the message sent was the message received. Finally, the sender wants an evidence trail and record that can be used in court if a dispute occurs regarding the contents and/or the time of delivery of the message.

The recipient wants to be certain of the validity of the sender's identity. The recipient wants to know that the authenticated document cannot be altered in transmission without detection. Like the sender, the recipient wants the message to be secure from eavesdropping and wants a record and evidence trail available in the event of a future dispute. Finally, the recipient wants the ability to refuse acceptance of an authenticated message if he so chooses.

The third party is concerned with liability, costs, and legal responsibility. The third party wants to be sure that the authenticated document was received as sent and is error free. The third party wants minimal records for each authenticated document. The third party wants to be able to provide absolute security and anonymity for clients except in those cases where court order requires that it allow government access. When government does require access, the third party wants to be able to provide real-time access as efficiently and inexpensively as possible.

The government wants real-time access to electronic documents in those cases where court-ordered access is granted. Governments want key escrow for all internationally transmitted, encrypted documents. The inventors believe that any method for authenticated electronic document transmission must take into account the needs cited above. Additionally, given that commerce is global, electronic document authentication methods must be adaptable to the access requirements of any government.

Besides the considerations cited above, an authentication method must be acceptable to the marketplace for pragmatic purposes. Users should not have to purchase special equipment. Any user with a computer and a modem should be able to use the system, no matter what the platform. As with the mail or commercial document delivery systems, users should be able to transmit authenticated electronic documents to strangers and to both willing and hostile recipients. Additionally, an authentication method should be user friendly, no more difficult to operate than an Automated Teller Machine.

Encryption is central to the invention because it ensures that only the intended recipient can receive the plaintext of an authenticated document, it validates sender entity and it provides privacy and security. As envisioned, the invention uses a neutral third party for key distribution, record keeping, and authenticated message distribution. The third party consists of an Authentication Agent and a Distribution Agent that might be a single entity, but by keeping these agents separate, user security and privacy are enhanced. If the agents are separate, the Authentication Agent has access to encryption keys, but never has access to the encrypted documents. Likewise, the Distribution Agent has access to encrypted documents, but never has access to encryption keys.

Both the Authentication and the Distribution Agent are neutral witnesses to the transmission and receipt of authenticated electronic documents. Additionally, the Authentication Agent serves as a registry that keeps indisputable proof of document contents and a log of document transfers. The Distribution Agent serves as an electronic mailbox for authenticated documents and as a witness to the time, date and content of these authenticated messages.

All users must be registered with the Authentication Agent, and must obtain authentication method software from the agent. After registration, users generate unique asymmetric key pairs from this point referred to as private and public keys. Each user keeps the private key and downloads the public key to the Authentication Agent. All communication from the Authentication Agent to users is encrypted using the respective user's public key.

The Authentication Agent encrypts data needed to initiate the authentication process with sender and recipient public keys. Thus, only the holders of the private keys, the legitimate sender and recipient, are able to implement the authentication process, and to access the authenticated document. As a result, the recipient can be sure that the sender is who he says he is, because only the legitimate sender has the private key that will enable him to initiate the authentication process. Likewise the sender can be sure that only the intended recipient has access to the authenticated document because only the recipient can access the keys needed to decrypt the document. Thus, the use of participant public keys provides sender and recipient identification validation.

Briefly, the authentication process works as follows. A sender uses his authentication software to create an undecryptable digital string from this point on called a Document Abstract from the electronic document he wishes to have authenticated. At present, the software uses a one-way function to create the abstract. A one-way function is a mathematical process that is irreversible and produces a distinctive, one-of-a-kind numerical representation from the electronic document. If even a single bit of the document is changed, the Document Abstract will be a different number. Thus, the document abstract is a unique distillation of the original document that cannot be reversed to reveal the contents of the document The sender contacts an Authentication Agent and downloads the Document Abstract, the identity of the intended recipient, and his own identity. The agent's computer, accesses the sender and recipient files and checks to see that they are current. If so, the agent's computer generates a first and second encryption key and loads them, along with a copy of the Document Abstract, into a file. This file becomes the Document File, with the file address serving as the document identification number.

The Agent retrieves the sender and recipient public keys from their respective files. Next, the agent encrypts plaintext copies of the first and second encryption keys and the document identification number with the sender's public key. Then the Authentication Agent encrypts a plaintext copy of the first encryption key with the recipient's public key. The agent downloads this encrypted data to the sender along with a copy of the Document Abstract.

Upon receipt of this information from the agent, the sender's software first compares the Document Abstract from the agent to the sender's copy of the Document Abstract. If the abstracts match, the sender can be assured that the agent has an accurate record of the document on file. Next, the electronic document is split into two parts, a header that contains an address block, and the body, which is the rest of the document. The sender's software places the Document Identification Number in the header. Next, the sender's software encrypts the body of the document with the second key, then encrypts the header and the body with the first key. The sender then downloads the encrypted document and the first key encrypted with the recipient's public key to a Distribution Agent.

The Distribution Agent, which is also a computer, maintains electronic mailboxes for users. The Distribution Agent places the encrypted document and the copy of the first key in the intended recipient's mailbox, then notifies the recipient that he has received an authenticated document. Upon the request of the recipient, the Distribution Agent downloads the encrypted document and the first key to the recipient. The recipient's software uses the first key to decrypt and thus reveal the header and the Document Identification Number. The recipient contacts the Authentication Agent and requests the second key using the Document Identification Number for reference.

The Authentication Agent downloads the second key and a copy of the Document Abstract to the recipient. The recipient's software uses the second key to decrypt the body of the document, then creates a Document Abstract from the decrypted document. The recipient's software compares the Document Abstract it created to the Document Abstract from the Authentication Agent. If the abstracts match, the recipient can be sure that he received an error free, unaltered document. To complete the authentication process, the recipient's software automatically downloads the abstract derived from the decrypted document to the Authentication Agent.

The Agent compares the abstract with the sender's abstract. If the abstracts match, the agent places the abstract from the recipient in the document file. With the recipient's matching abstract on file, the sender has proof that the recipient received and opened an exact copy of the electronic document he sent. Through the use of strong encryption both sender and recipient can be certain that no one other than they themselves had access to the document. With the abstracts on record neither party can alter their copy of the plaintext document without detection, leaving no basis for a dispute over the content of the document.

BRIEF DESCRIPTION OF THE DRAWINGS

Further objects and advantages of the invention will become apparent from the following description and claims, and from the accompanying drawings, wherein:

FIG. 2 shows block diagrams of data strings referred to in FIG. 1.

FIG. 3 shows a block diagram of the contents of the document file created and added to by the process of FIG. 1.

FIG. 4 shows a graphic representation of the various stages of electronic document encryption brought about by the processes of FIGS. 1 and 5.

FIG. 7 shows changes to the document file as a result of the process of FIG. 5.

FIG. 8 shows further changes to the document file as a result of the process of FIG. 5.

DETAILED DESCRIPTION OF THE PREFERRED EMBODIMENT

Figure 9:
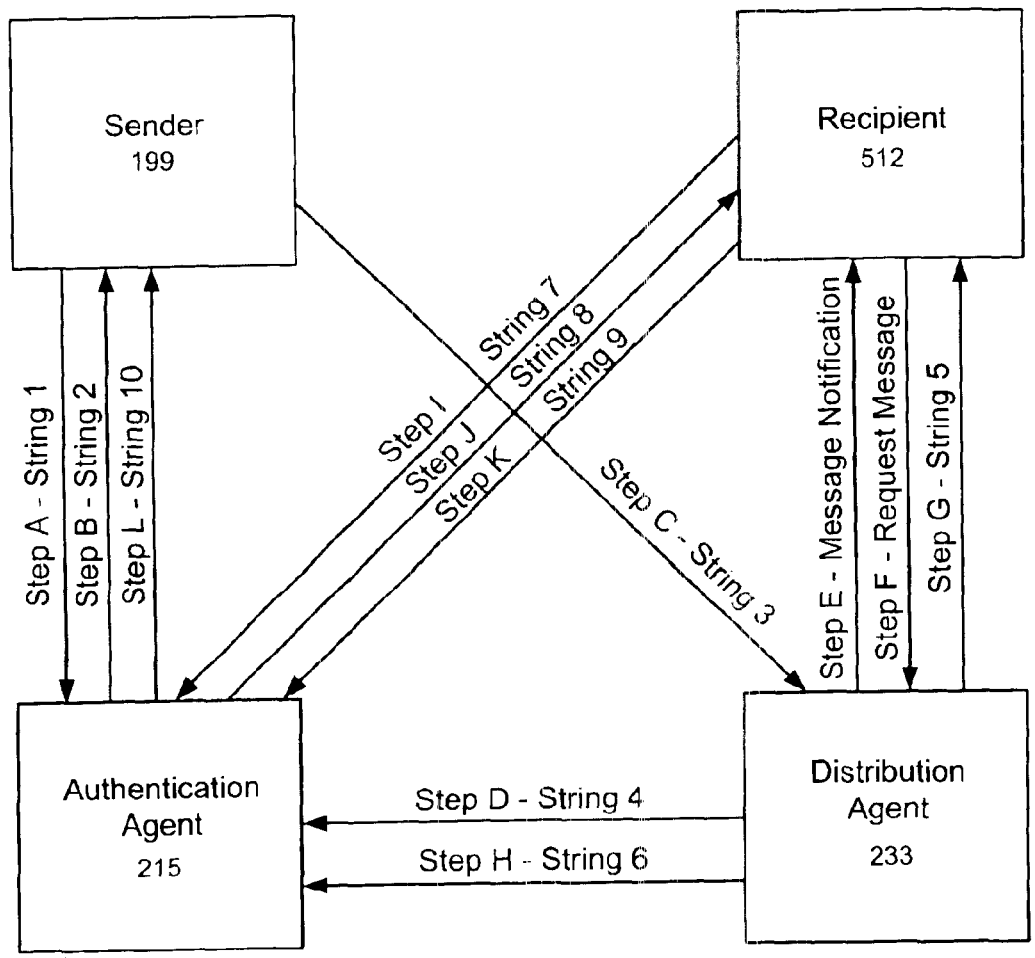
FIG. 9 diagrams the data flow from the various parties as a sequence of steps.

Referring now to the drawings in detail wherein like numerals refer to like elements throughout the several drawings, one sees that FIG. 9 diagrams the data flow from the various parties—the sender, the recipient, the authentication agent and the distribution agent.

At the outset, the authentication process of the present invention is highly automated. As such, the third parties, the aforementioned Authentication Agent and distribution Agent, are computerized databases. As envisioned, all interaction between the third parties and a sender and recipient are totally automated with no human interaction on the part of the third parties. The communication between the various parties can be any electronic communication method, such as the Internet, direct modem connections or other dedicated or non-dedicated data lines. It is further envisioned that all four parties are separate entities. In particular, the Authentication Agent and the Distribution Agent are separate and independent, notwithstanding that they both follow the protocols of the present invention.

It is further envisioned that the actions required of the sender and recipient in the authentication process are minimal. The sender typically defines the electronic document to be authenticated, provides the name and address of the recipient, and then indicates a commitment to send the authenticated document. All other actions taken as the sender's part of the authentication process originate from, and are governed by, the sender's authentication software.

Likewise, the recipient's actions are typically limited to accessing the authenticated document from the Distribution Agent, and indicating that he or she desires a second encryption key. All other parts of the authentication process originate from, and are governed by, the recipient's authentication software. It should be noted that sender and recipient elements are part of a single software package because all participants in the method of the invention will be both sender and recipient.

Figure 1:
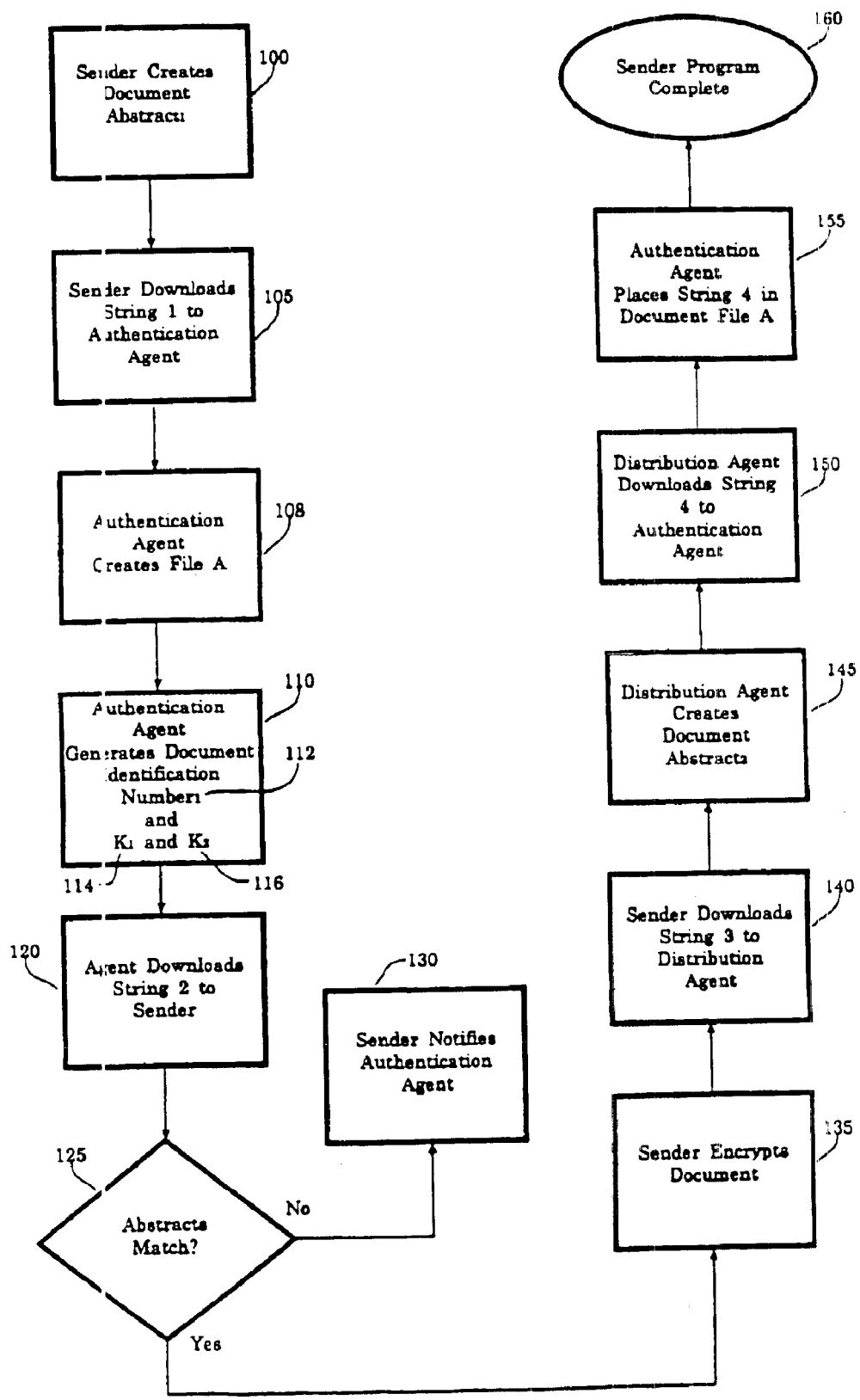
FIG. 1 shows a flow chart detailing the interaction of the sender with the Authentication Agent and the Distribution Agent.

In FIG. 1, the sender begins the authentication process 100 by using the authentication software to transform an electronic document, Document 1, item 400 FIG. 4, into Document Abstract$_1$, item 200 FIG. 2, String 1. As envisioned, the software uses a one-way function to produce the abstract. A one-way function is typical of those used for hashing functions and as known to those skilled in the art and as previously discussed, the result of a one-way function cannot be reversed. Additionally, if even one bit of Document 1 were different, the resulting Document Abstract would differ substantially from Document Abstract$_1$ Thus, Document Abstract$_1$ serves as the numeric equivalent of a fingerprint of Document 1, differentiating it from all other electronic documents. In other words, Document Abstract$_1$ can be compared to a similar Document Abstract to determine if the underlying documents are the same without providing the ability to determine the contents of the underlying document.

Step A

After creating Document Abstract$_1$, the sender's software saves a copy of the abstract, and generates String 1, which as shown in FIG. 2, includes Document Abstract$_1$ 200, the sender's identification 205, and the recipient's identification 210. Then, as shown in step 105 of FIG. 1, FIG. 2 and Step A of FIG. 9, String 1 (as encrypted by the sender in accordance with the Authentication's Agent's public key of an asymmetric encryption/decryption routine) is communicated to the Authentication Agent 215. The encryption of String 1 using the Authentication Agent's public key ensures that all parties to the authenticated document—the sender, the recipient and the Authentication Agent—can be certain that only the Authentication Agent can access String 1, ensuring security and privacy for all involved.

Step B

Authentication Agent 215 receives and decrypts String 1 and thereafter confirms that the sender and the recipient are registered and if their registration data is current. If so, the Authentication Agent creates a Document File A as shown in element 108 of FIG. 1, the address of which serves as Document Identification Number$_1$ 112 FIG. 1. The Authentication Agent also generates two encryption keys, K$_1$ and K$_2$ items 114 and 116 respectively of FIG. 1. This action is shown as 110 of FIG. 1.

The Authentication Agent then loads the Document File with Document Abstract$_1$ 200, the recipient identity 210, the sender identity 205, K$_1$ 114 and K$_2$ 116, the public keys of the sender and recipient 300 (again, of an asymmetric encryption/decryption routine) which are accessed from their respective files, and the time and date of the reception of String 1, item 305. These elements are represented in block form as File A in FIG. 3. File A represents the contents of the Document File at the start of the authentication process. File A is an indisputable record of the fact that the sender indicated he wanted to send the electronic document represented by Document Abstract$_1$ as an authenticated document to the recipient on the day and time recorded in Time and Date Record$_1$ item 305.

After placing the aforementioned data in File A, the Authentication Agent communicates String 2 of FIG. 2 to the sender as shown by 120 of FIG. 1 and further shown as Step B of FIG. 9. As shown in FIG. 2, String 2 contains K$_1$ 114 and K$_2$ 116, Document Identification Number$_1$ 112, a copy of the Document Identification Number encrypted with the public key of the Authentication Agent (shown as Document Identification Number$_2$ 220), Document Abstract$_1$ 200, and K$_3$ 225 (K$_3$ 225 being encrypted with the Public Key of the Recipient). The Authentication Agent encrypts the forementioned data of String 2 with the public key of the sender. By use of the sender's public key, the Authentication Agent makes the data of String 2 accessible only to the sender.

Impostors or eavesdroppers cannot access the information of String 2 because they do not possess the sender's private key required to decrypt String 2. Thus, the recipient can be certain that a sender is who he says he is because an impostor would be unable to access the information required to send an authenticated document decipherable by the recipient.

Step C

The software of sender 199 decrypts the data from String 2 as received from the Authentication Agent 215, and compares the copy of Document Abstracts obtained from the decryption of String 2 to the previously saved copy of Document Abstract$_1$, as shown by 125 FIG. 1. It should be noted that the Authentication Agent obtains the copy of Document Abstract$_1$ of String 2 from the Document File. Thus, item 125 is a comparison of the abstract on file with the Authentication Agent to the abstract saved by the sender. If the abstracts match, the sender is assured that the Authentication Agent has saved an accurate copy of Document Abstract$_1$ in the Document File. Additionally, the sender knows that he has irrefutable proof of the contents of the electronic document to be authenticated, which is Document Abstract$_1$, on file with the Authentication Agent.

If the abstracts do not match in the comparison of item 125, the sender's software outputs an error message to the sender and notifies the Authentication Agent 215 as shown in step 130 of FIG. 1. A mismatch at this point means that there might have been transmission errors, or the Authentication Agent might have placed an inaccurate copy of Document Abstract$_1$ in the Document File. In any case, the situation has to be rectified for the authentication process to proceed.

In item 135 FIG. 1, the software of Sender 199 encrypts the electronic document. The transformation of the plaintext electronic document to the encrypted document is shown in FIG. 4. As previously stated, item 400 represents the electronic document in plaintext form. The sender's software splits the electronic document into two parts, a header Section 405 and a Body Section 410.

Header Section 405 would typically contain the letterhead of the sender and a block addressing the recipient. An example would be the letterhead and address block of a standard business letter. If the electronic document is a video clip or an audio file, the sender's software will formulate a text Header Section in which both sender and recipient are clearly identified.

Next, as shown in FIG. 4, the sender's software attaches Document Identification Number$_1$ 112 to Header 405, then encrypts Body 410 using K$_2$ 116. The encrypted Body is shown as element 415 in FIG. 4. The sender's software then encrypts the entire electronic document, including the previously encrypted body, using K$_1$ 114. The result is shown as item 420 FIG. 4. It should be noted that this encryption procedure produces a document with no demarcation between the Header and the Body of the document thus preventing hackers from using demarcation as an aid to breaking the encrypted document.

In item 140 of FIG. 1 and Step C of FIG. 9, the sender 199 communicates String 3 (see FIG. 2) to the Distribution Agent. As is the case with the Authentication Agent, the sender's software contains the address and the public key of the Distribution Agent. Before sending String 3, the sender's software first prompts the sender to decide if he wishes to send the authenticated electronic document. If the sender indicates a desire to proceed, the software composes String 3 as described below and encrypts String 3 using the Distribution Agent's public key. Use of the Distribution Agent's public key by the sender's software ensures that only the Distribution Agent has access to String 3.

As shown in FIG. 2, String 3 contains the encrypted document 420, K$_1$ encrypted in the recipient's public key 225, the Document Identification Number encrypted using the public key of the Authentication Agent, Document Identification Number$_2$ 220, a Document Title 230 that states who the sender is and what the document is about, and the recipient's identification 210. When the Distribution Agent receives String 3, it makes a record of the time and the date of receipt. The Distribution Agent then decrypts string 3 with its private key to reveal the plaintext Document Title 230, the plaintext recipient identification 210, the Encrypted document 420, the encrypted Document Identification Number$_2$ 220, and the encrypted Recipient K$_1$ 225.

Step D

Next, as shown by item 145 FIG. 1, the Distribution Agent derives Document Abstract$_2$. The Document 420 of the resulting String 3 is still encrypted—the header has been encrypted by K$_1$ and the body has been encrypted first by K$_2$ and then with K$_1$ by the sender's software. The Distribution Agent then uses the one-way function on the encrypted document 420 to create the abstract resulting in irrefutable proof of the contents of the encrypted document, Document Abstract$_2$.

In item 150 of FIG. 1 and Step D of FIG. 9, the Distribution Agent downloads String 4 of FIG. 2 to the Authentication Agent. As shown in FIG. 2, String 4 contains the Document Abstract of the encrypted document created by the Distribution Agent (Document Abstract$_2$, item 235); the Document Identification Number encrypted using the Authentication Agent's public key (Document Identification Number$_2$ 220); and a record of the time and date when the Distribution Agent received String 3 (Time and Date Record$_2$ 240). The Distribution Agent uses the Authentication Agent's public key to encrypt String 4, thus ensuring that only the Authentication Agent has access to the data of String 4.

Step E

When the Authentication Agent receives encrypted String 6, it decrypts the data using the Authentication Agent's private key to derive decrypted String 4 thereby obtaining (decrypted) Document Identification Number$_2$ to reference the location of the document file within the memory of Authentication Agent. Then the Authentication Agent places the data of String 4 in the Document File A, item 155 FIG. 1. At that moment, the contents of the Document File are represented as File B FIG. 3. File B is the same as File A with the addition of Document Abstract$_2$ 235 and Time and Date Record$_2$ 240. With this information in the document file, the sender has irrefutable proof of the contents of the electronic document he sent to the Distribution Agent as well as an irrefutable record of the time and date that the Distribution Agent received the encrypted electronic document.

With the placing of the data of String 4 in File B, the sender's active participation in the process is ended as indicated by item 160 FIG. 1. From this point on, the recipient, 512 FIG. 6, is the active participant in the authentication process as shown by the flow chart of FIG. 5.

As shown in step E of FIG. 9, the Distribution Agent then sends an electronic message, such as an E-mail or other electronic message, to the recipient 512 simply stating that an authenticated message is available for the recipient. This E-mail or other electronic communication is envisioned to include the unencrypted Document Title, item 230 of String 3.

Step F

Figure 5:
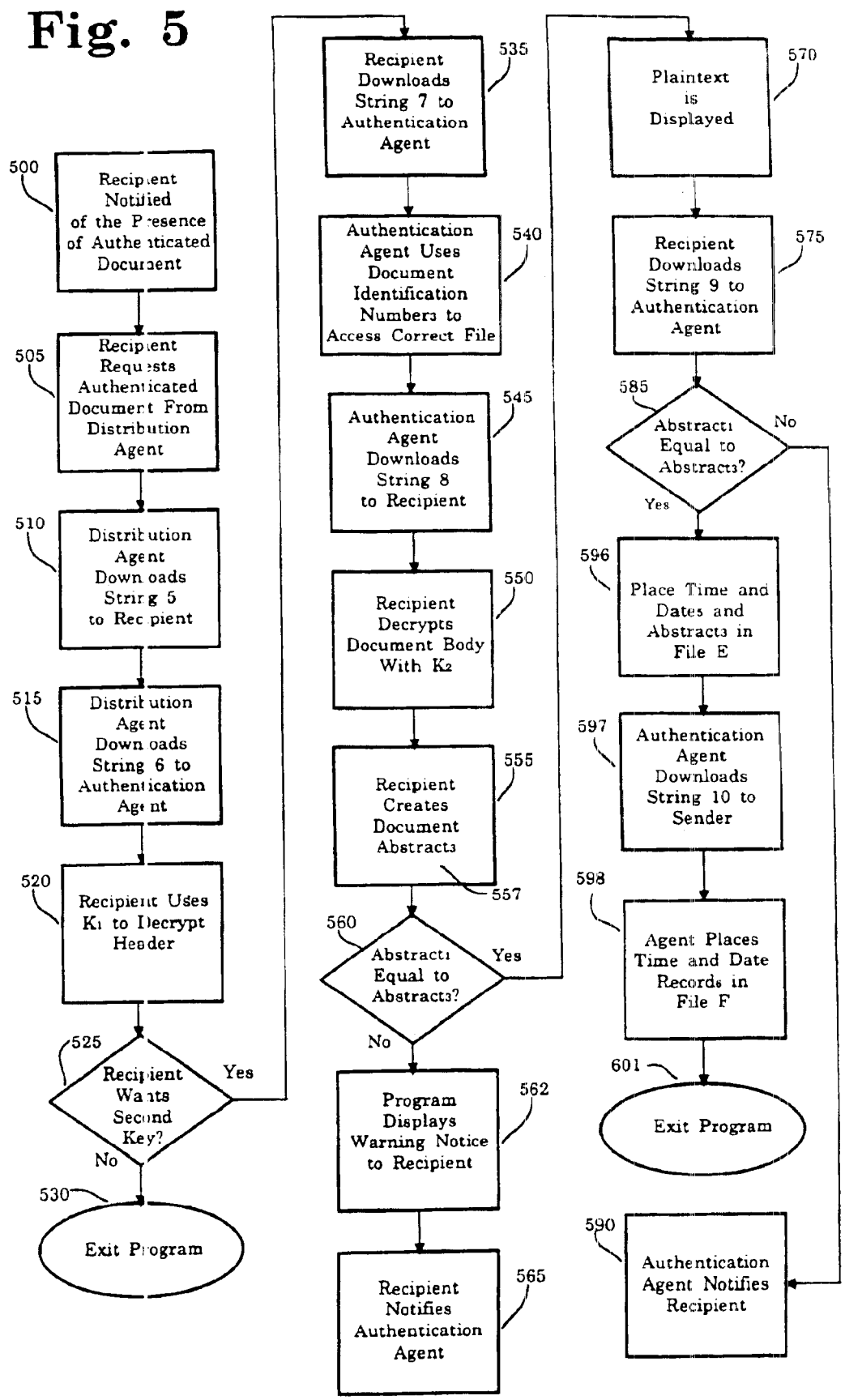
FIG. 5 shows a flow chart detailing the interaction between recipient, Distribution Agent, Authentication Agent, and sender.
Figure 6:
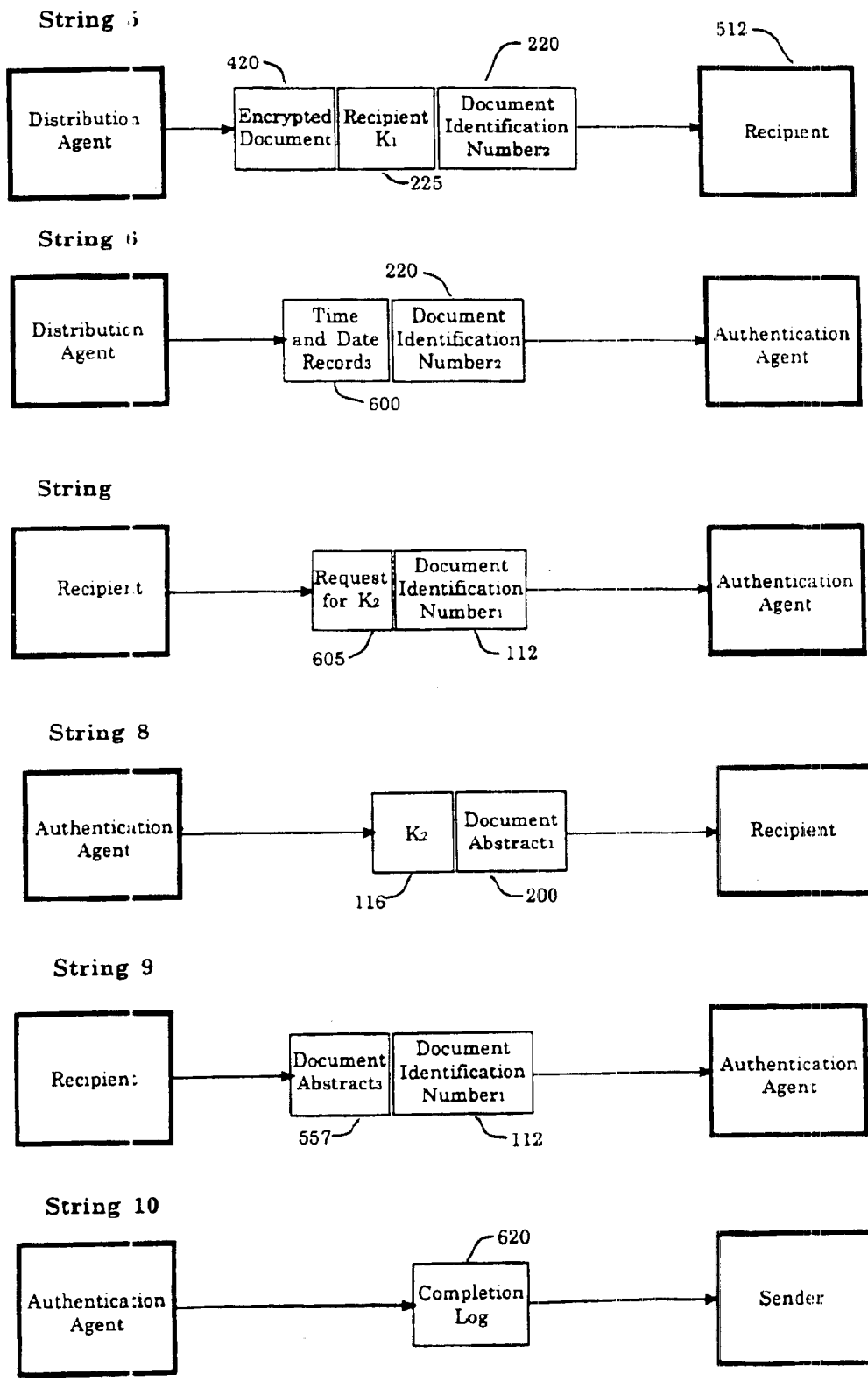
FIG. 6 shows block diagrams of data strings referred to in FIG. 5.

When the recipient 512 checks his E-mail or otherwise receives the communication of step E of FIG. 9, he finds the announcement of the authenticated message 500, FIG. 5. The recipient 512 reads the information from the Document Title, item 230 of String 3. If upon reading this information, the recipient 512 decides to access the encrypted document, he requests that the Distribution Agent download the authenticated document 505 as shown in Step F of FIG. 9.

Step G

In response to the request of 505 (Step F), the Distribution Agent downloads String 5 of FIG. 6 to the recipient 512 as shown in FIG. 5, item 510.

String 5 contains the encrypted document 420 and K$_1$ encrypted with the recipient's public key 225, as well as the Document Identification Number encrypted with the Authentication Agent's public key 220.

Step H

The Distribution Agent records the time and date of the recipient's request for the authenticated document and also records the time and date that String 5 was downloaded to the recipient. This time and date information is the content of Time and Date Record$_3$ 600 FIG. 6, String 6. The Distribution Agent couples Time and Date Record$_3$ with Document Identification Number$_2$ item 220 FIG. 6 to form String 6 of FIG. 6, then communicates String 6 to the Authentication Agent 515 FIG. 5, also see Step H of FIG. 9.

As with String 3, the Distribution Agent encrypts String 6 with the Authentication Agent's public key ensuring that only the Authentication Agent can access the data of String 6. When the Authentication Agent decrypts and accesses the data of String 6, it uses decrypted Document Identification Number$_2$ as a reference to place Time and Date Record$_3$ in the correct document file. File C of FIG. 7 shows the configuration of the document file after receipt of String 6. Time and Date Record$_3$ 600 is now part of the permanent record of the authenticated document. Time and date Record$_3$ is the sender's proof that the recipient 512 was sent the encrypted document 420 and K$_1$ encrypted with the recipient's public key 225, both of FIG. 6, at the time and date shown by Time and Date Record$_3$.

Step I

As shown by item 520 FIG. 5, the recipient's software automatically decrypts K$_1$ using the recipient's private key and uses the decrypted key, K$_1$, to transform the encrypted document into Document 4, item 417 FIG. 4. As a result of this action, the recipient 512 has access to the Header Section and the Document Identification Number, Document Identification Number$_1$ but not to the body 410 of the document (see FIG. 4). In item 525, the recipient 512 decides if he wants to access the rest of the document i.e., body 410) by requesting the private key K$_2$ corresponding to the Document Identification Number$_1$ Item 112 as shown in String 7 of FIG. 6 and Step I of FIG. 9. Otherwise, the authentication process terminates and the Document File remains configured as in File C FIG. 7.

In File C, the sender has proof that the encrypted document was downloaded to the recipient at the time and date of Time and Date Record$_3$. Because Document Abstract$_2$ is in File C, the sender also has proof of the contents of the encrypted electronic document. Thus the sender can prove that he made an electronic document available, i.e. downloaded by the Distribution Agent, to the recipient 512 at a certain time and date.

If the recipient 512 decides he wants to access the rest of the document, he communicates String 7 of FIG. 6 to the Authentication Agent as shown by item 535 FIG. 5 and Step I of FIG. 9. In order to generate String 7, it is envisioned that the recipient 512 preferably obtains the Document Identification Number$_1$ 112 by reading it from the screen and entering it manually on the keyboard to place it in String 7. It is envisioned that this act of obtaining information from the screen and inputting on the keyboard is important to the evidence trail of the invention. If the only way Document Identification Number$_1$ 112 can get into String 7 is through deliberate actions of the recipient, it proves that the header was decrypted successfully because the recipient 512 was able to read the number from the screen. It also proves that the number was correctly interpreted and that the recipient 512 wanted the second key. It can therefore be argued that there is no other way that the number could appear in String 7.

In this example Document Identification Number$_1$ 112 was used as a proof of receipt and decryption. In actual practice, the document ID will be too long and a simple word right be used instead as proof of receipt. In this case Document Identification Number$_1$ 112 will be included in String 7 automatically with the proof of receipt, the aforementioned simple word, being a third element of String 7.

The recipient's software encrypts the data of String 7 with the Authentication Agent's public key. Thus, the request for K$_2$ 605, Document Identification Number$_1$ 112, and Document Identification Number$_2$ 220, all of String 7 of FIG. 6, can only be accessed by the Authentication Agent.

Step J

Upon receipt of String 7, the Authentication Agent saves a record of the time and date that it received String 7. Next, the Authentication Agent decrypts the data of String 7 and uses the decrypted Document Identification Number, Document Identification Number$_1$ 112, String 7 of FIG. 6 to access the correct Document File, item 540 of FIG. 5. The Authentication Agent retrieves K$_2$, a copy of the Document Abstract, Document Abstract$_1$, and the recipient's public key from the Document File.

The Authentication Agent uses the recipient's public key to encrypt K$_2$ and Document Abstract$_1$, then couples this encrypted data together to form String 8 of FIG. 6. Next, the agent communicates this data to the recipient 512 (see item 545 of FIG. 5 and step J of FIG. 9), and makes a record of the time and date when String 8 was downloaded to the recipient. The time and date record of the receipt of String 7, the recipient's request for K$_2$, and the downloading of String 8 are saved as Time and Date Record$_4$, and placed in the Document File as shown by item 700, File D FIG. 7.

Time and Date Record$_4$ is the sender's proof that the intended recipient 512 has accessed the document and was able to decrypt the document header. Only the intended recipient 512 has access to the private key that will allow this decryption of item 225, K$_1$ encrypted with the recipient's public key. Nobody else, not even the Authentication Agent, has that key. Thus, only the intended recipient 512 could have decrypted the document header thereby obtaining the correct Document Identification Number, Document Identification Number$_1$ 112, to access the correct Document File.

Additionally, Time and Date Record$_4$ is proof that the encryption/decryption process is working correctly because the recipient 512 was able to obtain the Document Identification Number, Document Identification Number$_1$.

Step K

When the recipient 512 receives String 8 from the Authentication Agent, his software uses his private key to decrypt K$_2$ 116 and Document Abstract$_1$ 200, both of String 8, FIG. 6. The recipient's software uses the decrypted second key to decrypt the body of the document as shown in 550 of FIG. 5. At this point, the document format is that of Document 3 in FIG. 4. The recipient's software then removes the Document Identification Number 112 from the decrypted document and removes any demarcation between the Document Header and the Body.

The result of this action is an exact copy of the original electronic document as represented by Document 1 FIG. 4. The recipient's software creates a document abstract, Document Abstract$_3$ 577, from the decrypted document as shown in item 555 FIG. 5. The recipient's process for creating Document Abstract$_3$ is exactly the same as the sender's process for creating Document Abstract$_1$ thus the Document Abstracts should match if the recipient's copy of the electronic document is identical to the sender's original electronic document. In item 560 FIG. 5, the recipient's software compares the abstracts. If the abstracts match, the recipient 512 can be certain that his copy of the electronic document is an exact copy of the sender's original electronic document.

If the abstracts do not match, the recipient's software gives the recipient 512 a warning notice 562 FIG. 5, and the recipient 512 notifies the Authentication Agent of the problem 565 FIG. 5. If the abstracts do match, the recipient's software displays the decrypted document for the recipient 570 FIG. 5, and automatically downloads String 9 to the Authentication Agent 575 FIG. 5.

To provide additional evidence that the complete document has been successfully decrypted and has been made accessible to the recipient, the invention requires that the recipient enter unique information from the decrypted document before saving the document or quitting the application.

This unique information is automatically downloaded as part of String 9. With this information in addition to the abstract, the invention provides proof that a plaintext message identical to that sent by the sender was made accessible to the recipient.

As shown in FIG. 6, String 9 consists of Document Abstract$_3$ 557 and Document Identification Number$_1$ 112. Both item 557 and item 112 are the product of the recipient's decryption process and serve as proof of the results of that process. As with all communication from the recipient 512 to the Authentication Agent, items 557 and 112 are encrypted with the Authentication Agent's public key.

Step L

When the Authentication Agent receives String 9, it records the time and date of the receipt. Next, it decrypts String 9, and uses Document Identification Number$_1$ to access the correct Document File. The Authentication Agent saves the time and date of the receipt of String 9, Time and Date Record$_5$ 705 File E FIG. 8. The agent then compares Document Abstract$_1$ 200 from File E with Document Abstract$_3$ 557 from String 9, item 585 FIG. 5.

If the Document Abstracts match, it proves that the recipient 512 received and gained access to a document identical to the document claimed to have been sent by the sender. Only if the recipient 512 had successfully decrypted a document identical to the document that produced Document Abstract$_1$, could the recipient 512 have produced a matching Document Abstract$_3$.

If the abstracts do not match, which is unlikely because they matched when compared by the recipient 560 FIG. 5, the Authentication Agent notifies the recipient 590 FIG. 5. If the abstracts do match, the Authentication Agent places Time and Date Records 705 and Document Abstract$_3$ 557 in File E FIG. 8. With this information in the Document File, the sender has irrefutable proof on record with a neutral third party, the Authentication Agent, that the recipient 512 has received and decrypted, at the time and date of Time and Date Records, the document that the sender claims to have sent. Additionally, if there is any dispute over the contents of the document, the sender can have a Document Abstract created from his version of the document and compared to the Document Abstract on file with the Authentication Agent. If the Document Abstracts match, the sender's version of the document was the document sent to, and received by, the recipient.

With item 597 FIG. 5, and as shown in Step L of FIG. 9, the Authentication Agent communicates String 10 (FIG. 6) to the sender 199. The Completion Log 620 FIG. 6 is a copy of the information in File E. This material gives the sender a complete history of his authenticated message and allows him to dispute the contents of File E if he believes it to be inaccurate.

Item 598 FIG. 5 has the Authentication Agent placing Time and Date Record$_6$ 710 in the Document File, File F FIG. 8. Time and Date Record$_6$ is the time and date that the Authentication Agent downloaded String 10 to the sender and serves to protect the interests of the Authentication Agent by providing proof that the process was complete and that the sender was notified of the completion of the authentication process. With that, the authentication process is complete 601 FIG. 5.

Key Escrow

As used for the purpose of the invention, the term "key escrow" refers to a third party retaining copies of encryption keys so that law enforcement and other government agencies can access encrypted communications upon demand. The present invention is key escrow ready, but access requires Authentication Agent and/or Distribution Agent cooperation. Neither third party will be willing to permit access without a court order, thus the invention has built-in privacy protection for the sender and recipient.

The United States Government wants the ability to surreptitiously access encrypted communication in real time. In this, the Government appears to hold encrypted communication access rights equivalent to telephone communication access rights. In both cases, the Government would seek access rights for law enforcement or national security reasons by means of court orders.

As stated earlier, the present invention is immediately ready for key escrow with no changes to the method. Key escrow is implemented by means of the Document Identification Number encrypted with the Authentication Agent's public key. Item 220 in String 2 of FIG. 2 is an example. Government access to authenticated documents will be described in two ways. The first example uses key escrow as the vehicle for access, the second example involves real-time access with the aid of the Authentication Agent or Distribution Agent.

Upon capturing item 220 from String 2, 3, 4, 5, or 6, the Government would present item 220 to the Authentication Agent along with a court order granting access to the decryption keys. The Authentication Agent would decrypt Document Identification Number$_2$, item 220, and use the decrypted information to access encryption keys $K_1$ and $K_2$, items 114 and 116. The Authentication Agent would turn the encryption keys over to the Government, and the Government would use the keys to decrypt the electronic document.

The Authentication Agent might also turn over a copy of Document Abstract$_1$ to the Government so that the Government could confirm that it had an accurate copy of the plaintext electronic document. The Government would create a Document Abstract from the decrypted plaintext document and compare the abstract to Document Abstract$_1$.

A second scenario, real-time access, has the Government with a court order that requires access similar to wiretap access. If the sender is under surveillance and requests an authenticated document, the Authentication Agent would download the encryption keys to the Government before or concurrent with the key download, String 2 FIG. 2, to the sender. This type of access is real-time. As soon as the Government captures the encrypted document 400 String 3, it can decrypt the document. Thus, the Government could easily have possession of the plaintext electronic document before the recipient 512 is even aware of the presence of an authenticated document in his mailbox.

The above example deals with the case where the sender is the subject of surveillance. If the recipient 512 is the subject, the Government would have to get a court order requiring access to the recipient's mailbox through the Distribution Agent in addition to getting a court order granting surveillance rights to the recipient's file at the Authentication Agent.

The first step the Authentication Agent takes when initiating an authenticated document exchange is to check the sender and recipient files to see if they are current. If the recipient's file is flagged for surveillance, the Authentication Agent will notify law enforcement about the impending document exchange and give law enforcement the encryption keys, the Document Abstract and the Document Identification Number. With this information, the Government can capture an authenticated message when it arrives at the Distribution Agent.

The Distribution Agent must decrypt the recipient's identity in String 3 so that it can place the authenticated document in the correct mailbox. If the document recipient 512 is the subject of court ordered surveillance, the Distribution Agent will turn a copy of String 3 over to the Government before placing the contents of String 3 in the recipient's mailbox. With String 3 in its possession, the Government can return to the Authentication Agent for the encryption keys, or if it already has the keys, can decrypt the document.

With the present invention, sender and recipient privacy is protected because the Government needs the cooperation of the Authentication Agent and/or the Distribution Agent to gain access to authenticated documents. Neither the Authentication Agent nor the Distribution Agent will grant access without a court order. Thus, the Government must be able to convince a judge that a grave intrusion into the privacy of the sender and recipient is warranted. Without Authentication Agent and Distribution Agent cooperation, the Government will not be able to access documents, thus there need be no concern about Government access outside the scope of any court order.

An Alternate Version of the Invention

If the invention does not need to provide for surreptitious government access, the invention may be simplified by using only one key, $K_1$ 114. Instead of downloading $K_2$ 116 to the sender, the Authentication Agent would download the recipient's public key. This would permit the method to dispense with item 225, $K_1$ encrypted in the public key of the recipient.

When encrypting plaintext document 400, the sender would encrypt the body of the document 410 with $K_1$ to arrive at the situation represented by item 417. Then the sender would further encrypt the entire document with the recipient's public key to arrive at the totally encrypted document item 420.

Upon receipt of the encrypted document from the Distribution Agent, the recipient would use the private key mate to the public key to decrypt the document to the state of item 417, thus revealing the header 405 and the Document Identification Number 112. The recipient would use the Document Identification Number to request $K_1$ from the Authentication Agent. The recipient would then use $K_1$ to decrypt the body of the document 410.

The method does not change significantly for the sender or the recipient. The sender still encrypts the document using two keys. The recipient 512 still has to request a key from the Authentication Agent. The Authentication Agent's process changes slightly. The Agent generates one key, $K_1$, instead of two keys, and downloads the recipient's public key instead of an encryption key encrypted with the recipient's public key. The Distribution Agent's process does not change.

The major change is that the Authentication Agent is no longer able to provide access to the encrypted document. Because the document is encrypted with the recipient's public key, only the recipient, the holder of the private key mate to the public key can decrypt the document. The Government will no longer be able to access the document.

Ramifications of the Invention

The present invention provides a method by which E-mail and other modes of digital data communication can be given evidentiary qualities. No longer will companies have to depend on expensive document carriers to transport critical documents. With the present invention, a contract may be sent from New York to Tokyo via E-mail with both sender and recipient able to have complete confidence in the security and accuracy of the data transfer process. The sender will be able to prove that the recipient accessed and successfully opened the document.

Additionally, both sender and recipient can be assured that any attempt by the other party to alter the electronic document after the fact will be detected immediately. Finally, both sender and recipient will know that the Authentication Agent has a log documenting the history of the authentication process. A sender will be able to state with complete confidence that he made an electronic document available to the recipient at an exact time and date, and that the recipient accessed and successfully opened the document at an exact time and date.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A method of secure communication of an electronic document from a sender to a recipient, verification of sending of the electronic document by the sender and verification of the receipt of the electronic document by a recipient, in association with at least one third party, comprising the steps of:

the sender generating a first hashed digital string based upon said electronic document and communicating said first hashed digital string to said at least one third party;

the sender encrypting first and second unencrypted portions of said electronic document with respective first and second encryption algorithms thereby generating respective first and second encrypted portions and communicating said first and second encrypted portions to said at least one third party;

said at least one third party communicating said first and second encrypted portions to said recipient;

said recipient using a first decryption algorithm thereby generating said first unencrypted portion;

said at least one third party, in response to a key request from said recipient, communicating to said recipient said first hashed digital string and a decryption key for decrypting output of said second encryption algorithm, said key request being recorded by said at least one third party as evidence of receipt of said electronic document by said recipient; and said recipient using said decryption key to generate said second unencrypted portion, said recipient further generating a second hashed digital string based upon said first and second unencrypted portions of said electronic document and comparing said first hashed digital string to said second hashed digital string.

2. The method of claim 1 wherein said step of said at least one third party communicating said first and second encrypted portions to said recipient is performed in response to a data request from said recipient to said at least one third party, said data request being recorded by said at least one third party.

3. The method of claim 2 wherein said key request includes said first unencrypted portion generated by said first decryption algorithm.

4. The method of claim 3 wherein said step of communicating said first hashed digital string to said at least one third party further includes the step of communicating a first number identifying the sender and a second number identifying the recipient.

5. The method of claim 1 wherein said second encrypted portion is generated by encrypting said second unencrypted portion by the second encryption algorithm and said first encryption algorithm and wherein said step of said recipient using a first decryption algorithm further includes using the first decryption algorithm on said second encrypted portion.

6. The method of claim 1 further including the step of the recipient communicating a message ultimately destined for the sender indicating results of the step of comparing said first hashed digital string to said second hashed digital string.

7. The method of claim 4 wherein said step of communicating said first hashed digital string and said step of communicating a first number and a second number further includes the step of the sender encrypting said first hashed digital string, said first number and said second number by a third encryption algorithm.

8. The method of claim 7 wherein said third encryption algorithm is an asymmetric encryption algorithm employing an asymmetric encryption key and an asymmetric decryption key associated with said at least one third party.

9. The method of claim 1 further including the step of storing said decryption key and said first unencrypted portion of said electronic document into a registry of said at least one third party prior to said step of said at least one third party communicating said first and second encrypted portions to said recipient.

10. The method of claim 4 wherein said step of storing said decryption key and said first unencrypted portion of said electronic document into a registry of said at least one third party serves as evidence of contents of said message.

11. The method of claim 1 wherein said recipient is supplied with a public key and a private key which serve to identify said recipient and wherein said public key is registered with said at least one third party.

12. A method for a recipient to receive and decrypt an encrypted electronic message and verify receipt and decryption thereof, comprising the steps of:
receiving said encrypted electronic message and a message identifying number, said electronic message including a first encrypted document portion encrypted by at least a first encryption algorithm and a second encrypted document portion encrypted by at least a second encryption algorithm, said first encryption algorithm being different from said second encryption algorithm;
decrypting said first encrypted document portion to obtain a first decrypted document portion;
transmitting a key request for a decryption key for said second encryption algorithm, said key request including said message identifying number, said key request further serving as evidence of receipt of said electronic message and decryption of said first encrypted document portion;
receiving said decryption key in response to said transmitting step, and further receiving a first hashed digital string based upon said encrypted electronic message prior to encryption;
decrypting said second encrypted document portion using said decryption key to obtain a second decrypted document portion;
generating a second hashed digital string based upon said first and second decrypted document portions, said first and second decrypted document portions intended to comprise decryption of said encrypted electronic message;
comparing said first hashed digital string to said second hashed digital string; and
transmitting a message indicating a result of said comparing step, further serving as evidence of decryption of said encrypted electronic message.

13. The method of claim 12 wherein said step of receiving is preceded by a step of requesting communication of said encrypted electronic message and a message identifying number in response to notification of said encrypted electronic message.

14. The method of claim 13 wherein said key request includes said first decrypted document portion.

15. The method of claim 14 wherein said requesting step is performed in response to manual input by the recipient.

16. The method of claim 12 wherein said recipient is supplied with a public key and a private key which serve to identify said recipient and wherein said public key is registered with said at least one third party.

17. The method of claim 13 wherein said second portion of the encrypted message is further encrypted by the first encryption algorithm using said first encryption key, and wherein said step of decrypting said first encrypted document portion further includes said portion of the encrypted message thereby removing one level of encryption on said second portion of the encrypted message.

18. A method of establishing an evidentiary trail substantially establishing that a sender has transmitted an encrypted message, the evidentiary trail substantially establishing contents of the encrypted message prior to encryption while substantially maintaining confidentiality of the undecrypted contents of the encrypted message, comprising the steps of:
recording that the sender has communicated a hashed digital string based upon said encrypted message prior to encryption and a number identifying an intended recipient;
recording that the sender has received a first encryption key, a second encryption key, a third encryption key, a document identification number substantially unique to the encrypted message, and encrypted version of said identification number, said hashed digital string; and
recording that the sender has communicated said encrypted message comprising a first portion of the encrypted message encrypted by at least a first encryption algorithm using said first encryption key and a second portion of the encrypted message encrypted by at least a second encryption algorithm using said second encryption key; and has further communicated said number identifying the intended recipient, said document identification number, and said third encryption key.

19. The method of claim 18 wherein said second portion of the encrypted message is further encrypted by said first encryption algorithm using said first encryption key.

20. The method of claim 18 wherein said step of recording that the sender has received a first encryption key further includes the step of recording that the sender has received an identification number associated with the encrypted message, and a third encryption key associated with the recipient.

21. The method of claim 20 wherein said step of recording that the sender has communicated said encrypted message further includes the step of recording that the sender has communicated a title associated with said encrypted message.

22. The method of claim 21 further including the step of recording that the sender has received a message indicating status of reception and decryption of said encrypted message by the intended recipient.

23. A method for establishing an evidentiary trail substantially establishing that a recipient has received an encrypted message and decrypted the encrypted message, comprising the steps of:

recording that the encrypted message has been communicated to the recipient, said encrypted message including a first encrypted portion and a second encrypted portion, wherein the first encrypted portion has been encrypted by at least a first encryption algorithm and the second encrypted portion has been encrypted by at least a second encryption algorithm, wherein the recipient uses a first decryption key to decrypt the first encrypted portion, but must receive a second decryption key to decrypt the second encrypted portion;

recording that the recipient has requested said second decryption key associated with the encrypted message;

recording that the recipient has received said second decryption key associated with the encrypted message and has further received a first hashed digital string based upon said encrypted message prior to encryption; and recording that the recipient has transmitted a message verifying that said decryption key has been received, that said second encrypted portion has been decrypted and that the recipient generated a second hashed digital string based on decryption of said encrypted message which matches said first hashed digital string.

24. The method of claim 23 wherein said second portion of the encrypted message is further encrypted by the first encryption algorithm using said first encryption key.

25. The method of claim 23 wherein step of recording that the encrypted message has been communicated to the recipient is preceded by and in response to the steps of:

recording that the recipient has been notified of the encrypted message; and recording that the recipient has requested the encrypted message.

26. The method of claim 25 wherein said step of recording that the recipient has requested said second decryption key further includes recording that the recipient has transmitted a decrypted result of said first encrypted portion.

27. The method of claim 26 wherein said step of recording that the encrypted message and a message identifying number has been communicated to the recipient further includes the step of recording that said first encryption key has been communicated to the recipient.

28. The method of claim 27 wherein said step of recording that the encrypted message has been communicated to the recipient further includes the step of recording that a message identifying number has been communicated to the recipient.

29. The method of claim 28 wherein said step of recording that the recipient has requested said second decryption key further includes the step of recording that the recipient has transmitted said message identifying number.

30. The method of claim 23 further including the step of recording said decryption key and an unencrypted version of said first encrypted portion prior to said step of recording that the encrypted message has been communicated to the recipient.

31. The method of claim 30 wherein said step of recording said decryption key and said unencrypted version of said first encrypted portion serves as evidence of contents of said electronic document.

32. A method of secure communication of an electronic document from a sender to a recipient, verification of sending of the electronic document by the sender and verification of the receipt of the electronic document by a recipient, in association with at least one third party, comprising the steps of:

the sender generating a first hashed digital string based upon said electronic document and communicating said first hashed digital string to said at least one third party;

the sender communicating first and second portions of said electronic document to said at least one third party;

said at least one third party communicating said first portion to said recipient;

said at least one third party, in response to a request from said recipient, communicating to said recipient said second portion of said document and said first hashed digital string, said request being by said at least one third party as evidence of receipt of said first portion of electronic document by said recipient; and said recipient generating a second hashed digital string based upon said first and second portions of said electronic document and comparing said first hashed digital string to said second hashed digital string.

* * * * *